July 8, 1924.
C. F. GREINER ET AL
STREET SWEEPER
Filed May 29, 1922
1,500,558
2 Sheets-Sheet 1
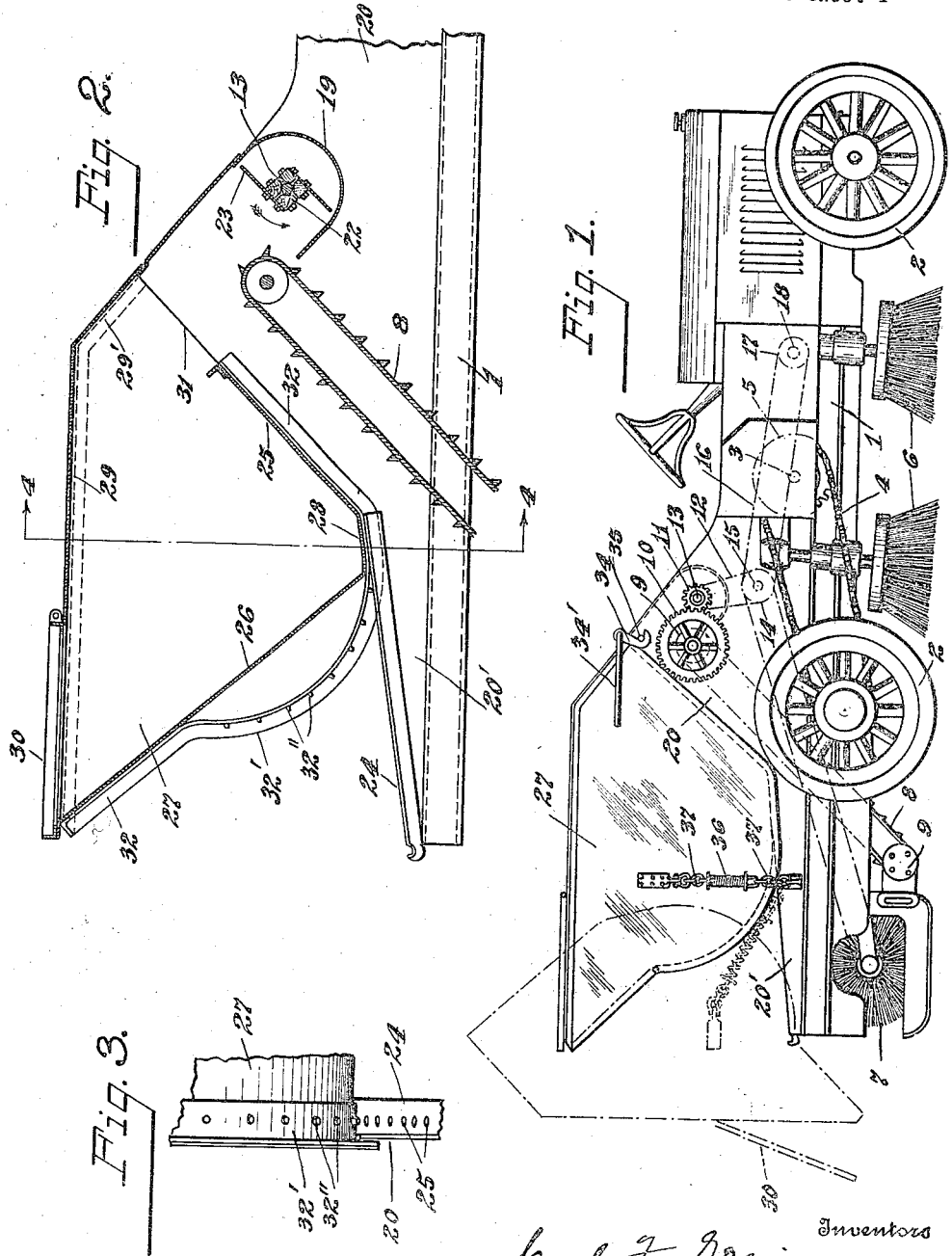
Inventors
Carl F. Greiner
and Andrew W. Aitken
By Staley Mosman
Attorneys

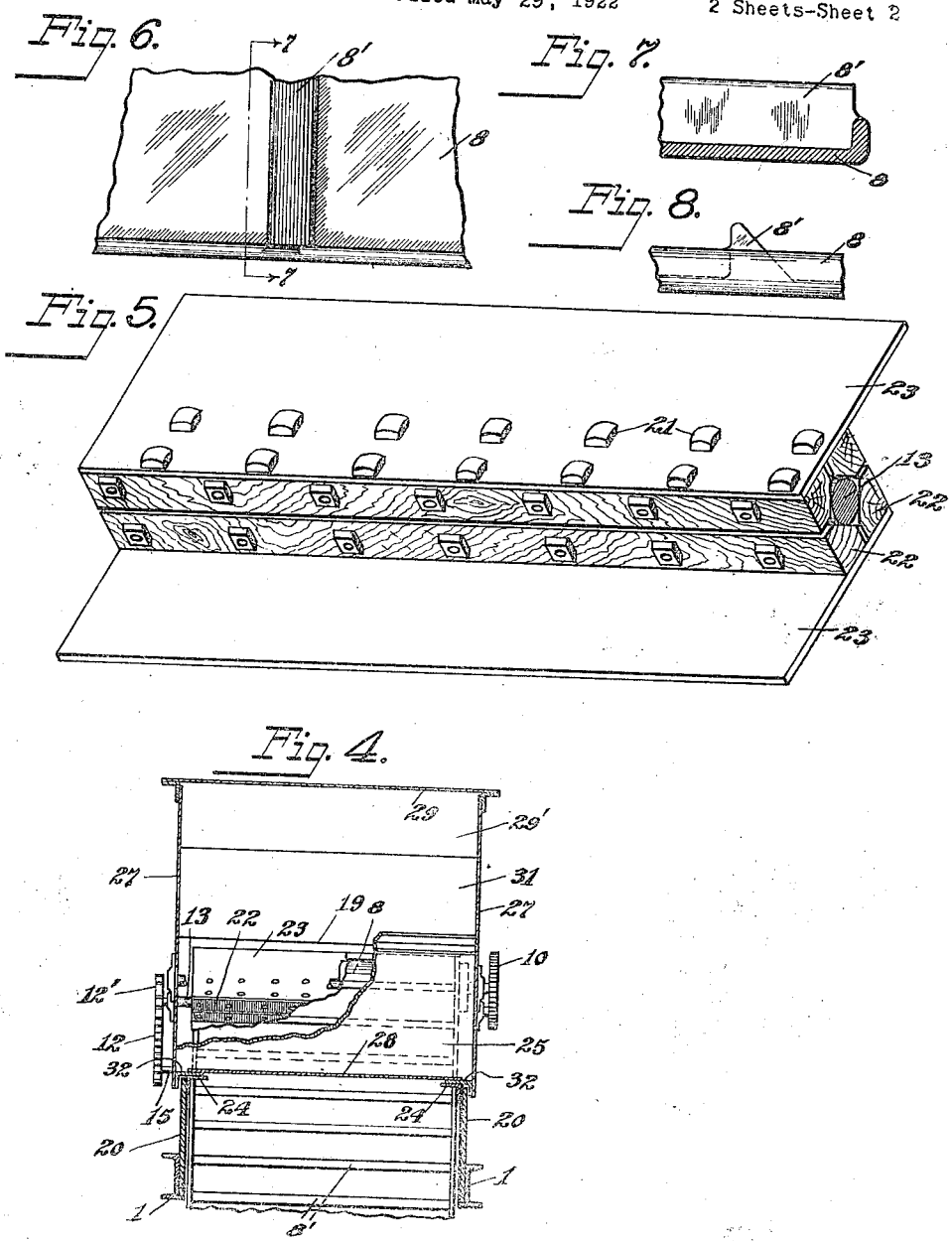

Patented July 8, 1924.

1,500,558

UNITED STATES PATENT OFFICE.

CARL F. GREINER AND ANDREW W. AITKEN, OF SPRINGFIELD, OHIO, ASSIGNORS TO THE SPRINGFIELD MOTOR SWEEPER COMPANY, OF SPRINGFIELD, OHIO, A CORPORATION OF OHIO.

STREET SWEEPER.

Application filed May 29, 1922. Serial No. 564,295.

*To all whom it may concern:*

Be it known that we, CARL F. GREINER and ANDREW W. AITKEN, citizens of the United States, residing at Springfield, in the county of Clark and State of Ohio, have invented certain new and useful Improvements in Street Sweepers, of which the following is a specification.

This invention relates to improvements in street sweepers.

An object of the invention is to provide an arrangement whereby the sweepings may be carried to a tiltable hopper or tank so disposed that the sweepings may be dumped therefrom to the rear of the machine.

A further object of the invention is to provide an arrangement of sweeping and conveying apparatus in connection with a tiltable hopper or tank, so disposed that the hopper may be tilted for the purpose of discharging the sweepings therefrom without interference from said apparatus.

A further object of the invention is to provide an improved arrangement whereby the sweepings may be discharged from elevating apparatus into a hopper or tank in an improved and effective manner; a further and more specific object in this connection being to provide an effective discharging device at the upper end of an endless conveyer in the nature of a rotary head having wings so disposed as to discharge the sweepings as they fall from the upper end of the elevator into a hopper located rearwardly of the conveyor.

A further object of the invention is to provide an improved construction of elevating apparatus, particularly that part thereof forming the endless belt or carrier.

In the accompanying drawings:

Fig. 1 is a side elevation of a machine embodying our improvements.

Fig. 2 is a longitudinal section of a portion of the same.

Fig. 3 is a rear elevation of a portion of the hopper and its track.

Fig. 4 is a vertical section on the line 4—4 of Fig. 2.

Fig. 5 is a perspective view of the discharging device.

Fig. 6 is a view of a portion of the elevator belt.

Fig. 7 is a section on the line 7—7 of Fig. 6.

Fig. 8 is a side elevation of a portion of the elevator belt.

Referring to the drawings, 1 represents the main frame of the machine and 2 the carrying wheels, the rear wheels being driven from a jack shaft 3 through chains 4. Vertically arranged sweeping brooms 6 are employed for conveying the sweepings toward the center of the machine in the manner described in the pending application of Andrew W. Aitken filed July 18, 1921, Ser. No. 485,414, and the horizontally disposed sweeper 7 places the sweepings upon the lower end of a conveyor belt 8 in the manner described in said application; this belt passing around suitable drums 9, the upper one of which is driven through the medium of the gear 10, pinion 11, chain 12 passing about a sprocket 12' on a shaft 13, and a sprocket 14 on a countershaft 15 and chain 16 passing about a sprocket 17 on the power take-off shaft 18. The conveyor belt extends upwardly and forwardly and discharges into a chamber formed by a transversely arranged casing 19 carried by two side supporting members 20 projecting upwardly from the side members of the main frame 1. The shaft 13 previously referred to extends through this casing and secured to this shaft by bolts 21 is a series of four blocks or strips 22 to which are in turn secured by the same bolts 21 a pair of oppositely-arranged and oppositely-extending wings or blades 23.

Each of the supporting plates 20 has a rearward extension 20' having an inclined upper edge which is reinforced by an angle-iron strip 24 with its horizontal wing provided with a series of equally-spaced holes 25 (Fig. 3), these strips 24 forming a track for a tiltable hopper to be described. The hopper has inclined forward and rear walls 25 and 26, end walls 27, a narrow bottom 28, a cover 29 inclined forwardly and downwardly, as shown at 29', and a door 30. The forward wall terminates at a point removed from the inclined cover portion 29' so as to leave an opening 31 extending throughout the width of the upper, forward portion of the hopper, Angle-irons 32 are secured at the side edges of the hopper body, each bent on a curve as indicated at 32' to form runners to cooperate with the tracks 24; each runner having a series of teeth 32'' to register with the holes 25. A latch 34 pivoted to a forward upper corner of the hopper body and having a handle 34', cooperates with a pin 35 on the side support 20 to hold the hopper in its normal position, in which position the forward portions of the angle iron members 32 rest upon the inclined rear edges of the supports 20. To tilt the hopper the latch is released and the hopper rolls by its own weight upon the tracks 24 until arrested by springs 36, one on each side of the hopper and connected respectively with the walls 27 and extensions 20' by chains 37.

The endless belt 8 of the conveyor is constructed of vulcanized rubber and fabric of sufficient flexibility to readily pass about the drums 9 of the conveying apparatus and have integrally formed transverse cleats 8'. This arrangement obviates the difficulty experienced with endless belts with attached cleats of dirt finding its way between the cleats and belt as the cleats pass about the drums and causing the cleats to tear away from the belt.

In the operation of the device the sweepings are placed in a windrow at the longitudinal center of the machine by the vertically-arranged sweeping brooms 6 and swept by the transversely-arranged broom 7 onto the lower end of the conveyor belt 8. This belt deposits the sweepings into the casing 19 from which they are forcibly discharged in a rearward direction through the opening 31 into the hopper by the winged discharger described. By the arrangement described it will be seen that the hopper is free to tilt rearwardly without interference from the conveying and discharging apparatus and the arrangement also permits the sweepings to be dumped at the rear of the machine, leaving the machine free to move forwardly immediately after the dumping operation has been completed.

Having thus described our invention, we claim:

1. In a street sweeper, a main frame, a hopper supported at the rear of said frame, an inclined conveyor extending to a point in proximity to the forward upper portion of said hopper, together with means for discharging the sweepings from said conveyor rearwardly into said hopper, said conveyor and discharging means being supported by said main frame, said hopper being capable of being moved rearwardly away from said conveyor and discharging means for the purpose of dumping the sweepings therein at the rear of the machine.

2. In a street sweeper, a main frame, a hopper located on the rear end of said frame, said hopper having an inclined forward wall, a conveyor supported by said frame extending from the ground to a point in proximity to the upper edge of said forward wall on the outer side thereof, means for discharging the sweepings from said conveyor into said hopper over the upper edge of said forward wall, and means whereby said hopper may be moved rearwardly away from said conveyor and discharging means to dump the sweepings at the rear of the machine.

3. In a street sweeper, a main frame, a hopper located on the rear of said frame and having an inclined forward wall, with an open space above the same, an inclined conveyor extending from the ground in the general direction of said wall on the outer side thereof and to a point in proximity to said space above the same, a casing open at the rear end of said conveyor to receive the sweepings therefrom, a rotary winged discharging device in said casing for discharging the sweepings into said hopper through the open space above the same, and means whereby said hopper may be tilted rearwardly to discharge the sweepings at the rear of the machine.

4. In a street sweeper, a hopper, an inclined conveyor extending from the ground to a point near the forward upper portion of said hopper, and a rotary winged discharging device at the upper end of said conveyor to discharge the sweepings therefrom rearwardly into said hopper.

5. In a street sweeper, a hopper mounted at the rear end of the machine having a closed top and an opening in the forward wall beneath the top, a conveyor for carrying the sweepings from the ground to a point adjacent the said opening, and a discharging device located at the upper end of said conveyor for forcibly discharging the sweepings therefrom through said opening into said hopper.

In testimony whereof, we have hereunto set our hands this 23rd day of May, 1922.

CARL F. GREINER.
ANDREW W. AITKEN.